United States Patent
Abotabl et al.

(10) Patent No.: US 12,278,774 B2
(45) Date of Patent: Apr. 15, 2025

(54) FEEDBACK COMMUNICATIONS FOR TRANSPORT BLOCKS WITH MULTIPLE CODE BLOCK GROUPS

(71) Applicant: QUALCOMM Incorporated, San Diego, CA (US)

(72) Inventors: Ahmed Attia Abotabl, San Diego, CA (US); Ahmed Elshafie, San Diego, CA (US); Yi Huang, San Diego, CA (US)

(*) Notice: Subject to any disclaimer, the term of this patent is extended or adjusted under 35 U.S.C. 154(b) by 381 days.

(21) Appl. No.: 17/659,150

(22) Filed: Apr. 13, 2022

(65) Prior Publication Data

US 2023/0336293 A1 Oct. 19, 2023

(51) Int. Cl.
*H04L 5/00* (2006.01)
*H04L 1/00* (2006.01)

(52) U.S. Cl.
CPC .......... *H04L 5/0044* (2013.01); *H04L 1/0007* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 11,265,133 B2* | 3/2022 | Yoshimura | H04L 1/1671 |
| 2018/0167932 A1* | 6/2018 | Papasakellariou | H04L 1/1671 |
| 2018/0270023 A1* | 9/2018 | Jiang | H04L 1/0068 |
| 2018/0287745 A1* | 10/2018 | Sun | H03M 13/1111 |
| 2019/0089494 A1* | 3/2019 | Park | H04L 1/1812 |
| 2019/0103943 A1* | 4/2019 | Wang | H04L 1/1854 |
| 2019/0150122 A1* | 5/2019 | Ying | H04W 72/23 370/329 |
| 2019/0222366 A1* | 7/2019 | Zhang | H04L 1/1812 |
| 2019/0335536 A1* | 10/2019 | Kwon | H04W 72/23 |
| 2019/0363833 A1* | 11/2019 | Wang | H04L 1/1819 |
| 2020/0008216 A1* | 1/2020 | Iyer | H04W 72/23 |
| 2020/0059327 A1* | 2/2020 | Kini | H04L 5/0055 |
| 2020/0084789 A1* | 3/2020 | Wang | H04L 1/1614 |
| 2021/0036763 A1* | 2/2021 | Nam | H04L 1/1861 |
| 2023/0336293 A1* | 10/2023 | Abotabl | H04L 5/0044 |

* cited by examiner

*Primary Examiner* — Hassan A Phillips
*Assistant Examiner* — Gautam Sharma

(57) ABSTRACT

Various aspects of the present disclosure generally relate to wireless communication. In some aspects, a user equipment (UE) may receive, from a network entity, a transport block that includes a number of code block groups (CBGs). The UE may transmit a feedback communication associated with the transport block, wherein the feedback communication indicates feedback associated with the CBGs using a number of feedback bits, and wherein the number of feedback bits is less than the number of CBGs of the transport block. Numerous other aspects are described.

30 Claims, 10 Drawing Sheets

FEEDBACK COMMUNICATIONS FOR TRANSPORT BLOCKS WITH MULTIPLE CODE BLOCK GROUPS

FIELD OF THE DISCLOSURE

Aspects of the present disclosure generally relate to wireless communication and to techniques and apparatuses for feedback communications for transport blocks with multiple code block groups.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a transport block that includes a number of code block groups (CBGs). The method may include transmitting a feedback communication associated with the transport block, wherein the feedback communication indicates feedback associated with the CBGs using a number of feedback bits, and wherein the number of feedback bits is less than the number of CBGs of the transport block.

Some aspects described herein relate to a method of wireless communication performed by a network entity. The method may include transmitting, to a UE, a transport block that includes a number of CBGs. The method may include receiving, from the UE, a feedback communication associated with the transport block, wherein the feedback communication indicates feedback associated with the CBGs using a number of feedback bits, and wherein the number of feedback bits is less than the number of CBGs of the transport block.

Some aspects described herein relate to an apparatus for wireless communication at a UE. The apparatus may include a memory and one or more processors coupled to the memory. The one or more processors may be configured to receive, from a network entity, a transport block that includes a number of CBGs. The one or more processors may be configured to transmit a feedback communication associated with the transport block, wherein the feedback communication indicates feedback associated with the CBGs using a number of feedback bits, and wherein the number of feedback bits is less than the number of CBGs of the transport block.

Some aspects described herein relate to an apparatus for wireless communication at a network entity. The apparatus may include a memory and one or more processors coupled to the memory. The one or more processors may be configured to transmit, to a UE, a transport block that includes a number of CBGs. The one or more processors may be configured to receive, from the UE, a feedback communication associated with the transport block, wherein the feedback communication indicates feedback associated with the CBGs using a number of feedback bits, and wherein the number of feedback bits is less than the number of CBGs of the transport block.

Some aspects described herein relate to a non-transitory computer-readable medium that stores a set of instructions for wireless communication by a UE. The set of instructions, when executed by one or more processors of the UE, may cause the UE to receive, from a network entity, a transport block that includes a number of CBGs. The set of instructions, when executed by one or more processors of the UE, may cause the UE to transmit a feedback communication associated with the transport block, wherein the feedback communication indicates feedback associated with the CBGs using a number of feedback bits, and wherein the number of feedback bits is less than the number of CBGs of the transport block.

Some aspects described herein relate to a non-transitory computer-readable medium that stores a set of instructions for wireless communication by a network entity. The set of instructions, when executed by one or more processors of the network entity, may cause the network entity to transmit, to a UE, a transport block that includes a number of CBGs. The set of instructions, when executed by one or more processors of the network entity, may cause the network entity to receive, from the UE, a feedback communication associated with the transport block, wherein the feedback communication indicates feedback associated with the CBGs using a number of feedback bits, and wherein the number of feedback bits is less than the number of CBGs of the transport block.

Some aspects described herein relate to an apparatus for wireless communication. The apparatus may include means for receiving, from a network entity, a transport block that includes a number of CBGs. The apparatus may include means for transmitting a feedback communication associated with the transport block, wherein the feedback communication indicates feedback associated with the CBGs using a number of feedback bits, and wherein the number of feedback bits is less than the number of CBGs of the transport block.

Some aspects described herein relate to an apparatus for wireless communication. The apparatus may include means for transmitting, to a UE, a transport block that includes a number of CBGs. The apparatus may include means for receiving, from the UE, a feedback communication associated with the transport block, wherein the feedback communication indicates feedback associated with the CBGs using a number of feedback bits, and wherein the number of feedback bits is less than the number of CBGs of the transport block.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
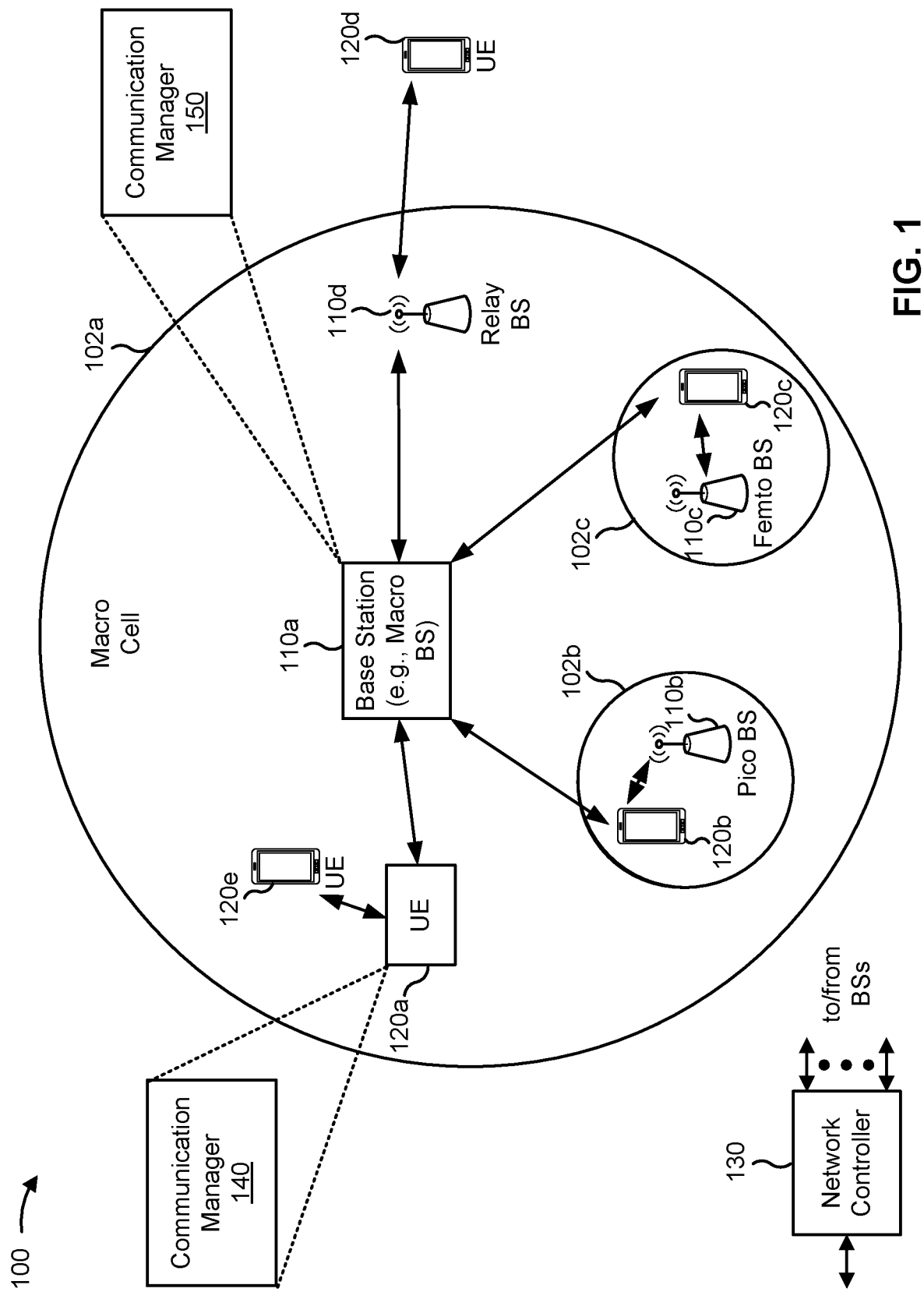
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a transport block that includes a number of code block groups (CBGs); and transmit a feedback communication associated with the transport block, wherein the feedback communication indicates feedback associated with the CBGs using a number of feedback bits, and wherein the number of feedback bits is less than the number of CBGs of the transport block. Additionally, or alternatively, the communication manager 140 may perform one or more other operations described herein.

In some aspects, the network entity described elsewhere herein may correspond to the base station 110 shown in FIG. 1. In such aspects, the base station 110 may include a communication manager 150. As described in more detail elsewhere herein, the communication manager 150 may transmit, to a UE, a transport block that includes a number of CBGs; and receive, from the UE, a feedback communication associated with the transport block, wherein the feedback communication indicates feedback associated with the CBGs using a number of feedback bits, and wherein the number of feedback bits is less than the number of CBGs of the transport block. Additionally, or alternatively, the communication manager 150 may perform one or more other operations described herein.

As indicated above, FIG. 1 is provided as an example. Other examples may differ from what is described with regard to FIG. 1.

Figure 2:
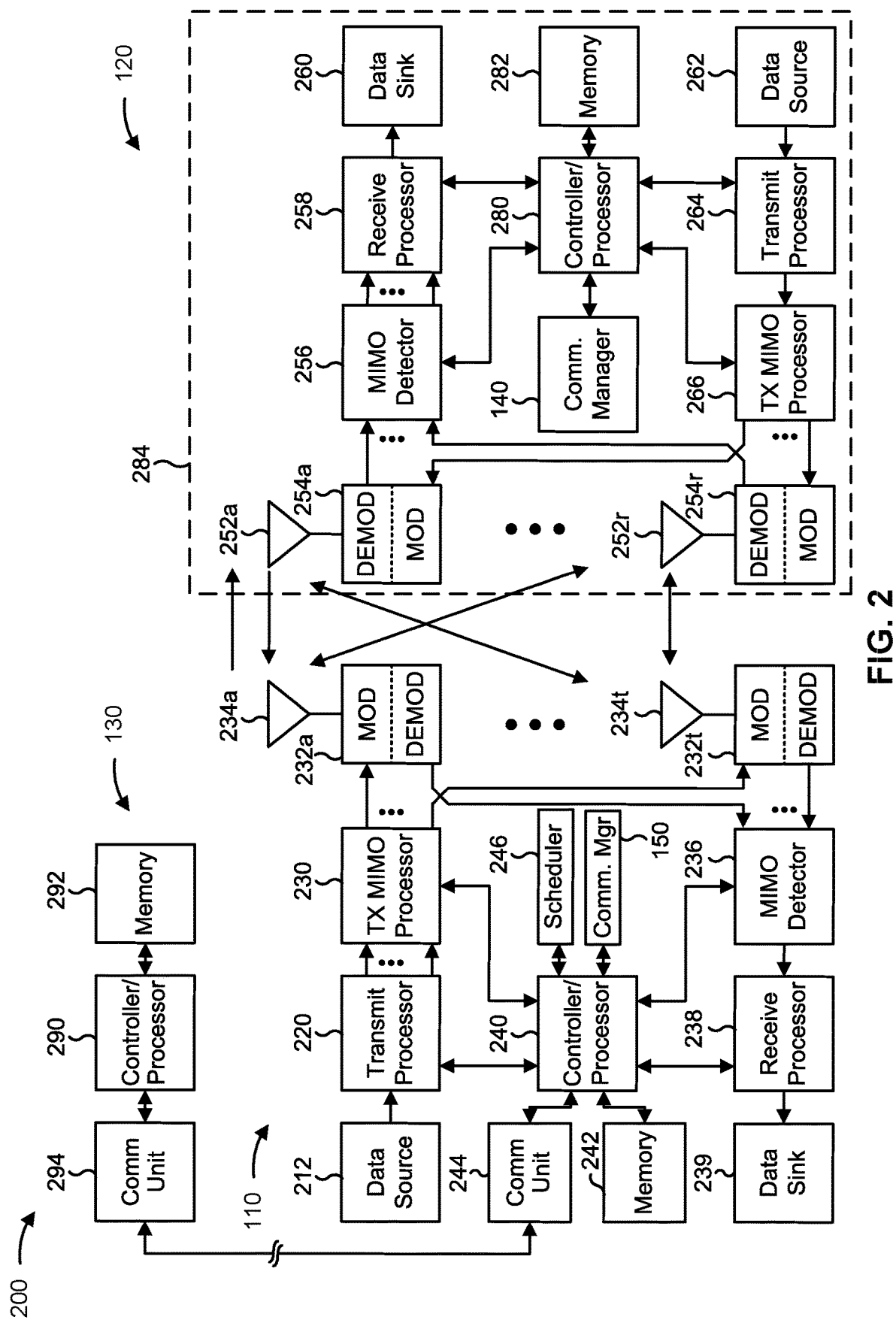
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with feedback communications for transport blocks with multiple code block groups, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a transport block that includes a number of CBGs; and/or means for transmitting a feedback communication associated with the transport block, wherein the feedback communication indicates feedback associated with the CBGs using a number of feedback bits, and wherein the number of feedback bits is less than the number of CBGs of the transport block. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE (e.g., UE 120), a transport block that includes a number of CBGs; and/or means for receiving, from the UE, a feedback communication associated with the transport block, wherein the feedback communication indicates feedback associated with the CBGs using a number of feedback bits, and wherein the number of feedback bits is less than the number of CBGs of the transport block. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
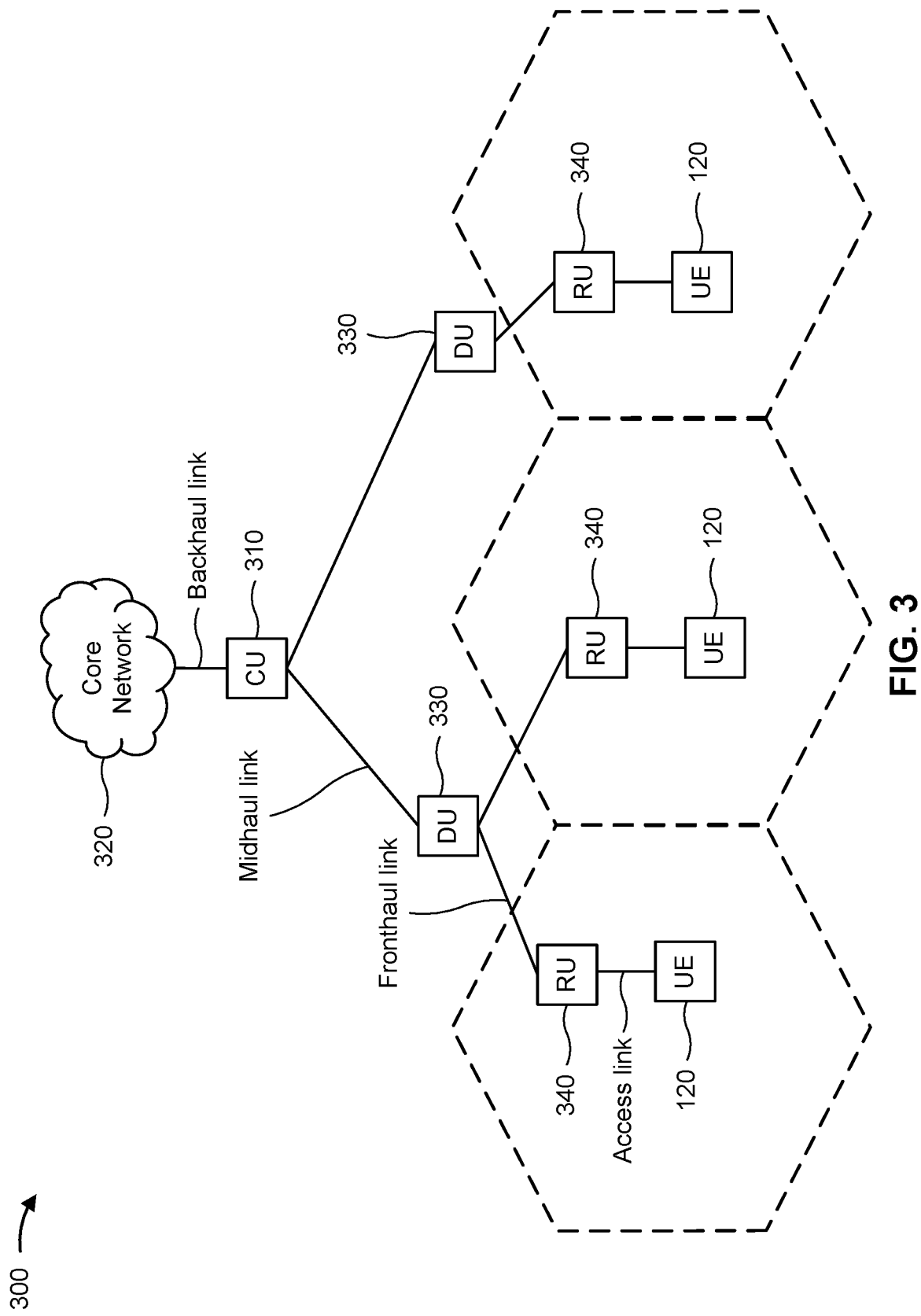
FIG. 3 is a diagram illustrating an example of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUS (O-DUs) 330 and O-RAN RUS (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
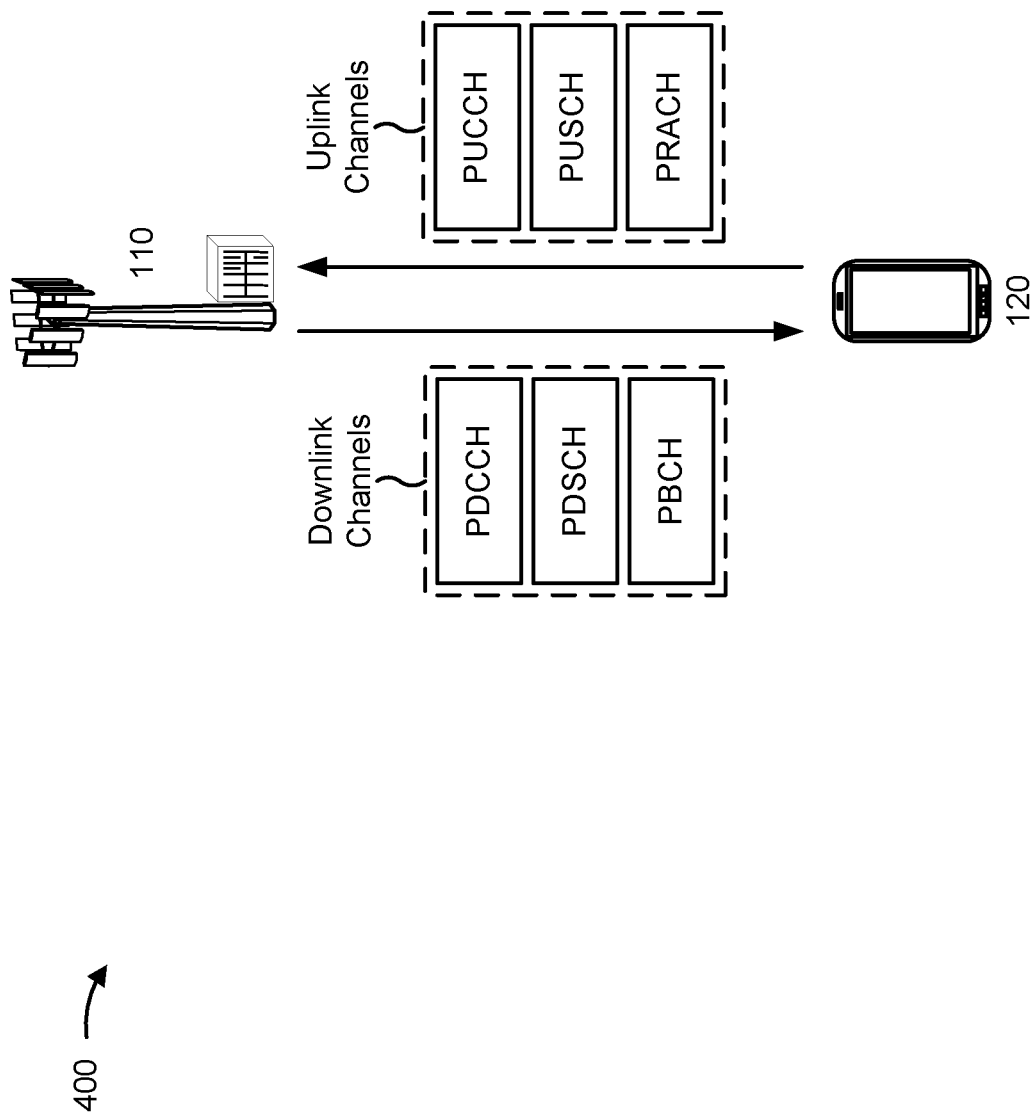
FIG. 4 is a diagram illustrating an example of physical channels and reference signals in a wireless network, in accordance with the present disclosure.

FIG. 4 is a diagram illustrating an example 400 of physical channels in a wireless network, in accordance with the present disclosure. As shown in FIG. 4, downlink channels may carry information from a network entity (e.g., a base station 110 as shown in FIG. 4, or a CU 310, a DU 330, an RU 340, or a similar network entity) to a UE 120, and uplink channels may carry information from a UE 120 to the network entity (e.g., the base station 110 or other network entity).

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples.

In some aspects, the UE 120 may transmit hybrid automatic repeat request (HARQ) feedback and/or another type of feedback communication in UCI on the PUCCH and/or the PUSCH. More particularly, in some aspects, the UE 120 may transmit acknowledgement (ACK) or negative acknowledgement (NACK) feedback (e.g., ACK/NACK feedback or ACK/NACK information) in UCI on the PUCCH and/or the PUSCH. ACK feedback may indicate that a communication was successfully received and decoded, and NACK feedback may indicate that a communication was not successfully decoded or was not received. In some aspects, feedback for wireless communications may be transport block (TB) based. For example, one feedback bit may be provided for an entire TB of the wireless communication, where the one feedback bit indicates an ACK or a NACK for the TB. In some other aspects, feedback for wireless communications may be CBG based. A CBG includes a plurality of successive code blocks (CBs) in a TB. One feedback bit may be used to provide feedback (e.g., ACK/NACK feedback) for each CBG of a TB. Accordingly, in CBG-based feedback, the quantity of feedback bits corresponds to the quantity of CBGs included in the TB. While CBG based feedback for sidelink communications increases the size of the PUCCH communication, retransmissions may be reduced (which reduces wireless resource usage, memory resource usage, and processing resource usage) because only failed CBGs (e.g., CBGs for which a NACK is reported) are retransmitted, rather than the entire TB, as is the case in TB-based feedback. Aspects of CBG-based feedback are described in more detail below in connection with FIG. 5.

As indicated above, FIG. 4 is provided as an example. Other examples may differ from what is described with regard to FIG. 4.

Figure 5:
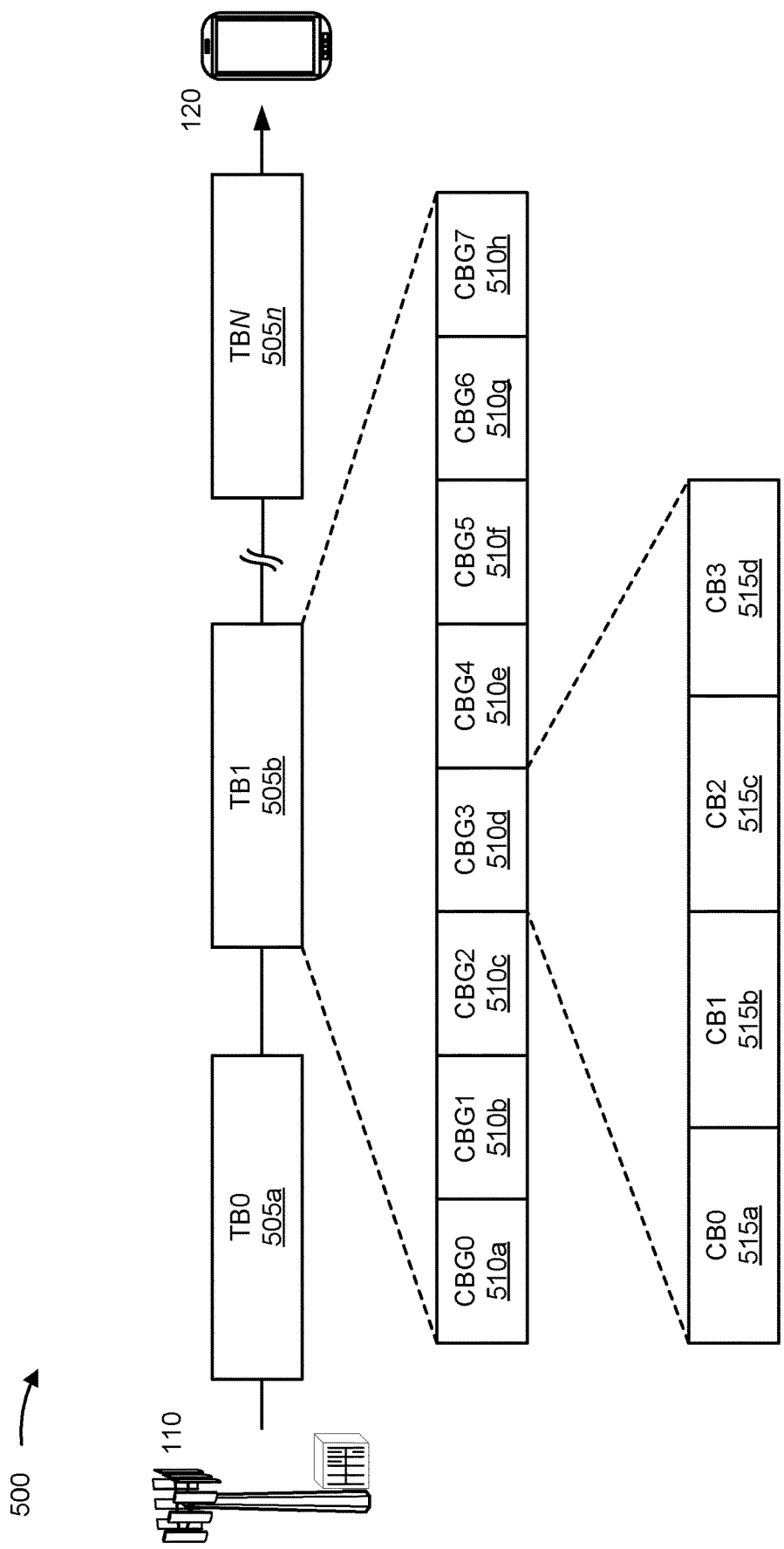
FIG. 5 is a diagram illustrating an example of a transport block (TB) associated with multiple code block groups (CBGs), in accordance with the present disclosure.

FIG. 5 is a diagram illustrating an example 500 of a TB associated with multiple CBGs, in accordance with the present disclosure.

As shown in FIG. 5, a wireless communication may include a number of TBs 505 carrying uplink or downlink data. For example, with respect to downlink communications, a network entity (e.g., which is shown as a base station 110, but which, in some other aspects, may be a different network entity such as a CU 310, a DU 330, an RU 340, or a similar network entity) may transmit a number of TBs to a UE (e.g., a UE 120) in the PDSCH. This may include, as shown in FIG. 5, a first TB 505a (indexed as TB0 in FIG. 5), a second TB 505b (indexed as TB1 in FIG. 5), and so forth up to an N-th TB 505n (indexed as TBN in FIG. 5). Each TB 505 may include a number of CBGs 510, and each CBG 510 may include a number of CBs 515. In the depicted example, the second TB 505b includes eight CBGs 510 (e.g., a first CBG 510a indexed as CBG0, a second CBG 510b indexed as CBG1, a third CBG 510c indexed as CBG2, a fourth CBG 510d indexed as CBG3, a fifth CBG 510e indexed as CBG4, a sixth CBG 510f indexed as CBG5, a seventh CBG 510g indexed as CBG6, and an eighth CBG 510h indexed as CBG7), with each CBG 510 including four CBs 515 (e.g., the fourth CBG 510d is shown as including a first CB 515a indexed as CB0, a second CB 515b indexed as CB1, a third CB 515c indexed as CB2, and a fourth CB 515d indexed as CB3). Each CB 515 may be a packet of data processed by a channel coding algorithm, with each CB 515 thus having its own set of cyclic redundancy check (CRC) bits for error detection at the UE 120.

In some aspects, error detection and HARQ retransmissions may be managed per TB 505, with the UE 120 providing feedback to the base station 110 using a HARQ process that includes one bit corresponding to each TB 505. Put another way, in some aspects, the UE may transmit a single ACK/NACK message (e.g., a single bit) for each TB 505. However, for such HARQ processes, a single bit error requires retransmission of the entire TB 505. This may lead to inefficient resource utilization because large volumes of data must be retransmitted even if there is only a relatively small number of bit errors. On the other hand, if error detection and HARQ retransmissions are managed per CB 515, only CBs 515 including one or more bit errors need to be retransmitted, avoiding retransmissions of large volumes of data. However, CB-based HARQ processes require increased overhead due to the large volume of ACK/NACK signaling (e.g., one bit ACK/NACK is required for each CB 515).

As a compromise between the need to retransmit large amounts of data for TB-based HARQ processes and the need to signal large amounts of ACK/NACK bits for CB-based HARQ processes, in some aspects, a CBG-based HARQ process may be utilized in which the UE 120 transmits a single ACK/NACK message for each CBG 510. In such HARQ processes, each CB 515 still has its own CRC bits for error detection, but the UE 120 transmits an ACK/NACK message for a CBG 510 as a whole. For example, if all CBs 515 within a CBG 510 are received and properly decoded, the UE 120 transmits an ACK message for the CBG 510, and if at least one CB 515 within the CBG 510 is not received or properly decoded, the UE 120 transmits a NACK message for the CBG 510. In such processes, only CBGs 510 including one or more bit errors need to be retransmitted.

For large TBs 505 that include many CBGs 510, CBG-based feedback still requires a large amount of overhead, because one ACK/NACK bit must be transmitted for each CBG 510. This is especially problematic when transmission parameters are adequately selected such that the UE 120 may decode all of the CBs 515 or else may only incorrectly decode a small number of CBs 515. In such aspects, even though there is a low bit error rate, the UE 120 must signal ACK/NACK feedback for each CBG 510 in a TB 505. In such instances, providing ACK/NACK feedback for each CBG 510 results in an inefficient utilization of resources, leading to increased latency and decreased throughput, among other performance degradation.

Some techniques and apparatuses described herein enable CBG-based feedback utilizing a reduced number of feedback bits (e.g., using a number of feedback bits that is less than a number of CBGs of the TB). More particularly, in some aspects, a UE (e.g., the UE 120) may receive, from a network entity (e.g., a base station 110, a CU 310, a DU 330, an RU 340, or a similar network entity), a TB (e.g., TB 505) that includes a number of CBGs (e.g., CBGs 510), and may transmit a feedback communication that indicates feedback associated with the CBGs using a number of feedback bits that is less than the number of CBGs of the TB. In some aspects, the feedback bits may jointly encode ACK/NACK feedback for the TB as well as a location of a first-in-time CBG that was incorrectly decoded. In response, the network entity may only need to retransmit the TB beginning with the first-in-time CBG that was incorrectly decoded. In some other aspects, the feedback bits jointly encode ACK/NACK feedback for the TB as well as a quantity of CBGs that were incorrectly decoded. In response, the network entity may adjust transmission parameters or the like used for the retransmission and/or future transmissions of other TBs. And in some other aspects, each of the feedback bits may indicate ACK/NACK feedback for a group of two or more CBGs, including, in some aspects, CBGs from two or more PDSCHs. In such aspects, the network entity may need to only retransmit CBGs belonging to groups of CBGs that included at least one CBG that was incorrectly decoded. As a result, overhead signaling and retransmissions may be reduced, resulting in a more efficient utilization of network resources, decreased channel congestion, decreased latency, increased throughput, and other performance benefits.

As indicated above, FIG. 5 is provided as an example. Other examples may differ from what is described with regard to FIG. 5.

Figure 6:
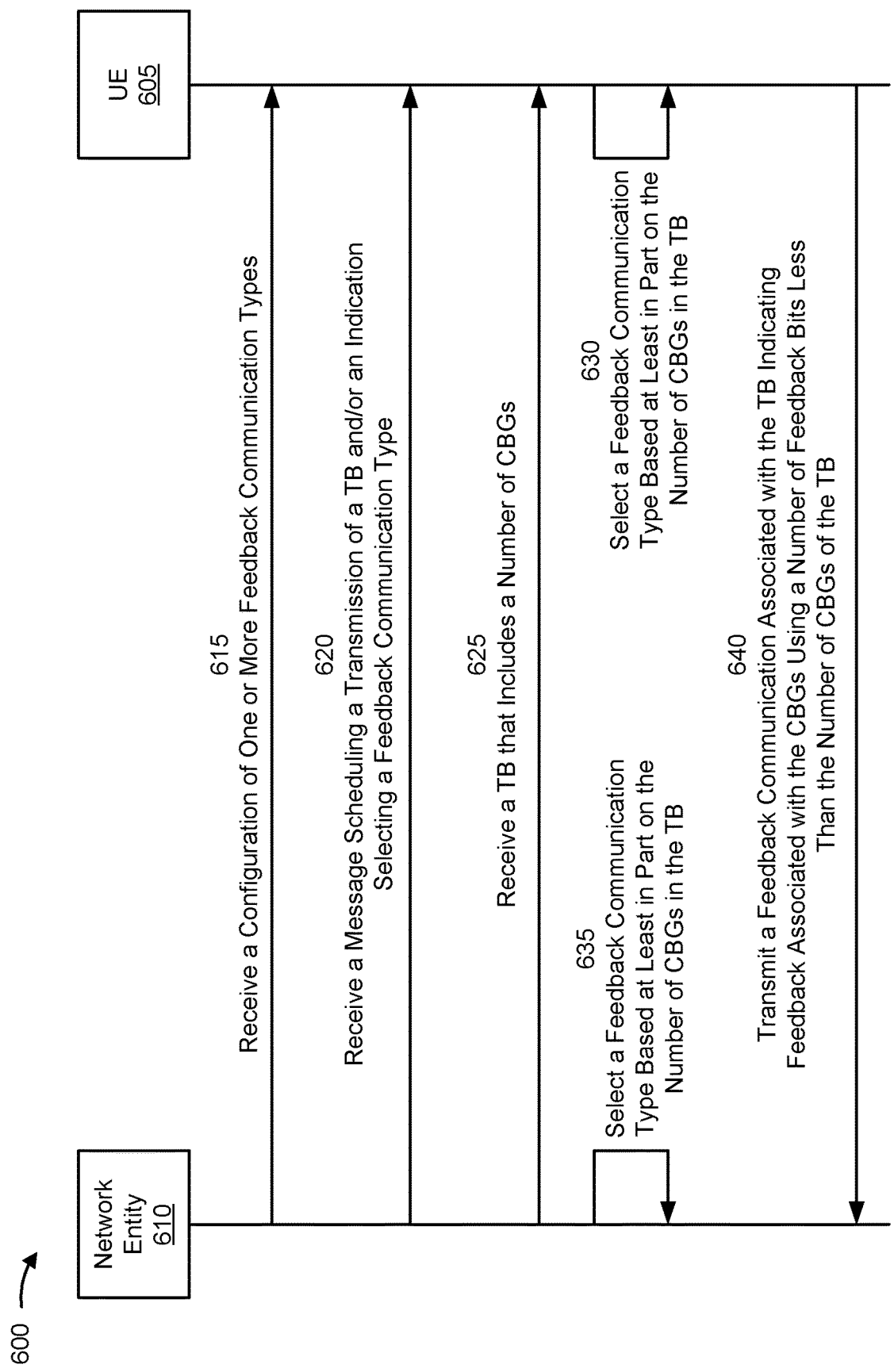
FIG. 6 is a diagram illustrating an example associated with feedback communications for TBs with multiple CBGs, in accordance with the present disclosure.

FIG. 6 is a diagram illustrating an example 600 associated with feedback communications for TBs with multiple CBGs, in accordance with the present disclosure. As shown in FIG. 6, a UE 605 (e.g., UE 120) and a network entity 610 (e.g., a base station 110, a CU 310, a DU 330, an RU 340, or a similar network entity) may communicate with one another.

As shown by reference number 615, in some aspects, the UE 605 may receive, from the network entity 610, a configuration of one or more feedback communication types for providing a feedback communication for a TB (e.g., one or more HARQ processes associated with a TB, such as TB 505). In some aspects, the UE 605 may receive the configuration indicated by reference number 615 via an RRC message. Moreover, the configuration indicated by reference number 615 may include a configuration of one or more feedback communication types that indicate feedback associated with CBGs (e.g., CBGs 510) associated with a TB using a number of feedback bits, with the number of feedback bits being less than a number of CBGs associated with the TB. In this way, the one or more feedback communication types may beneficially use less bits to indicate ACK/NACK feedback corresponding to a TB than the CBG-based HARQ process described in connection with FIGS. 4 and 5 while providing more detailed useful information to the network entity 610 than the TB-based HARQ process described in connection with FIGS. 4 and 5.

For example, in some aspects, the one or more feedback communication types may include a feedback communication type that utilizes a single feedback bit to provide ACK/NACK feedback for the TB as a whole. Additionally, or alternatively, in some aspects, the one or more feedback communication types may include a feedback communication type that utilizes a number of feedback bits that jointly encode ACK/NACK feedback for a TB and a location of a first-in-time CBG that was incorrectly decoded. Additionally, or alternatively, in some aspects, the one or more feedback communication types may include a feedback communication type that utilizes a number of feedback bits that jointly encode ACK/NACK feedback for the TB and a quantity of CBGs that were incorrectly decoded. Additionally, or alternatively, in some aspects, the one or more feedback communication types may include a feedback communication type that utilizes a number of feedback bits with each of the feedback bits indicating ACK/NACK feedback for a group of two or more CBGs. Aspects of the various feedback communication types will be described in more detail in connection with reference number 640.

In some aspects, the configuration of the one or more feedback communication types may indicate one feedback communication type, and thus the UE 605 may implement the configuration (e.g., the one feedback communication type) when providing ACK/NACK feedback for a TB. However, in some other aspects, the configuration of the one or more feedback communication types may include a configuration of multiple feedback communication types, wherein each of the feedback communication types is associated with a different CBG feedback granularity, such as the different feedback types described in more detail below in connection with reference number 640. In aspects in which the configuration of the one or more feedback communication types includes the configuration of multiple feedback communication types, the UE 605 may receive a configuration, message, or other indication indicating which one of the multiple feedback communication types should be used to provide feedback for a given TB.

More particularly, as shown by reference number 620, in some aspects, the UE 605 may receive, from the network entity 610, an indication selecting one of the multiple feedback communication types to be used to provide feedback for a given TB. For example, the UE 605 may receive a message, such as a DCI message, scheduling a transmission of a TB. In such aspects, the indication selecting the one of the multiple feedback communication types may be indicated using the DCI message that schedules the transmission of the TB. In some other aspects, the indication selecting the one of the multiple feedback communication types may be received in a different message, such as another DCI message (e.g., a DCI message that is not used to schedule the transmission of the TB), a MAC control element (MAC-CE) message, an RRC message, or a similar message. Moreover, in some aspects, the UE 605 may not receive an indication selecting the one of the multiple feedback communication types from the network entity 610, but instead the network entity 610 and/or the UE 605 may autonomously select the one of the multiple feedback communication types based at least in part on a configuration of a TB, or the like. Aspects of the network entity 610 and/or the UE 605 autonomously selecting the one of the multiple feedback communication types are described in more detail in connection with reference numbers 630 and 635.

As shown by reference number 625, in some aspects, the UE 605 may receive, from the network entity 610, a TB that includes a number of CBGs. In aspects in which the UE 605 received, from the network entity 610, a DCI message scheduling a transmission of the TB (as described above in connection with reference number 620), the UE 605 may receive the TB using time and/or frequency resources scheduled by the DCI message. In some aspects, the TB received via the communication indicated by reference number 625 may correspond to one of the TBs 505 described in connection with FIG. 5. In that regard, the TB 505 may include a number of CBs 515, each belonging to a corresponding CBG 510. As described above in connection with FIGS. 4 and 5, each CB 515 may be a packet of data processed by a channel coding algorithm, with each CB 515 thus having its own set of CRC bits for error detection at the UE 605.

As shown by reference numbers 630 and 635, in some aspects (e.g., aspects in which the UE 605 is configured with multiple feedback communication types and does not receive an indication of a selected feedback communication type to use for the TB), the UE 605 and/or the network entity 610 may select one of the multiple feedback communication types for providing feedback associated with the TB. In some aspects, the UE 605 and/or the network entity 610 may select one of the multiple feedback communication types based at least in part on the number of CBGs of the TB. For example, when the number of CBGs is relatively small, the UE 605 and/or the network entity 610 may select a feedback communication type that utilizes one feedback bit for each CBG, because the signaling overhead in such a case may be relatively minimal. However, when a TB includes many CBGs, the UE 605 and/or the network entity 610 may select another feedback communication type that utilizes less feedback bits than the number of CBGs of the TB in order to avoid excessive feedback overhead.

More particularly, the UE 605 and/or the network entity 610 may autonomously (e.g., without signaling to one another) select a feedback communication type based at least in part on whether the number of CBGs associated with the TB exceeds one or more thresholds. For example, the configuration described in connection with reference number 615 may configure three feedback communication types. A first feedback communication type of the three feedback communication types may be the CBG-based HARQ process described in connection with FIGS. 4 and 5, which utilizes one feedback bit for each CBG. A second feedback communication type of the three feedback communication types may jointly encode ACK/NACK feedback for the TB and a location of a first-in-time CBG that was incorrectly decoded (described in more detail below in connection with reference number 640). And a third feedback communication type of the three feedback communication types may jointly encode ACK/NACK feedback for the TB and a quantity of CBGs that were incorrectly decoded (also described in more detail below in connection with reference number 640).

In such aspects, the UE 605 and/or the network entity 610 may select the first feedback communication type when the number of CBGs of the TB is below a first threshold, may select the second feedback communication type when the number of CBGs of the TB exceeds the first threshold but is below a second threshold, and may select the third feedback communication type when the number of CBGs of the TB exceeds the second threshold. In some aspects, the UE 605 may be hard-coded with the first threshold, the second threshold, and/or other selection criteria, while in other aspects the UE 605 may receive, from the network entity 610, a configuration of the first threshold, the second threshold, and/or the other selection criteria, such as via an RRC message, a MAC-CE message, a DCI message, or the like.

As shown by reference number 640, the UE 605 may transmit, to the network entity 610, a feedback communication associated with the TB, wherein the feedback communication indicates feedback associated with the CBGs using a number of feedback bits, and wherein the number of feedback bits is less than the number of CBGs of the TB. For example, in some aspects, the feedback communication indicated by reference number 640 may include a single bit. In such aspects, if the UE 605 correctly decodes all CBs (and thus all CBGs), the UE 605 may transmit a one bit ACK feedback to the network entity 610, while if the UE 605 incorrectly decodes at least one CB (and thus as least one CBG), the UE 605 may transmit a one bit NACK feedback to the network entity 610.

In some other aspects, the feedback communication indicated by reference number 640 may include one or more additional feedback bits to convey information to the network entity 610 about some of the correctly decoded CBGs. For example, in some aspects the number of feedback bits of the feedback communication may jointly encode ACK/NACK feedback for the TB and a location of a first-in-time CBG that was incorrectly decoded. More particularly, the feedback bits may include two or more bits, and when of the two or more bits are "0," the feedback bits may indicate an ACK feedback for the TB as a whole (e.g., may indicate that each CBG was correctly decoded). Thus, in an example in which the feedback bits include two bits, bits indicating "00" may indicate ACK for the TB as a whole.

However, when at least one of the feedback bits is "1," the feedback bits may indicate a NACK feedback for the TB and a location of the first-in-time CBG that was incorrectly decoded. Thus, for two bits, bits indicating "01," "10," or "11" may indicate a NACK feedback for the TB as well as a location of the first-in-time CBG that was incorrectly decoded. More particularly, bits indicating "01" may indicate that the first-in-time CBG that was incorrectly decoded is within a first one-third of the CBGs, bits indicating "10" may indicate that the first-in-time CBG that was incorrectly decoded is within a second one-third of the CBGs, and bits indicating "11" may indicate that the first-in-time CBG that was incorrectly decoded is within a third one-third of the CBGs). For example, if the TB includes twelve CBGs, an indication of "01" may indicate that the first-in-time CBG that was incorrectly decoded is in CBGs one through four, an indication of "10" may indicate that the first-in-time CBG that was incorrectly decoded is in CBGs five through eight, and an indication of "11" may indicate that the first-in-time CBG that was incorrectly decoded is in CBGs nine through twelve. In some other aspects, more feedback bits may be utilized to provide finer granularity (e.g., for m feedback bits, each feedback bit may be used to provide feedback for $1/(2_m-1)$ of the total CBGs).

In such aspects, the network entity 610 may beneficially retransmit less than all of the TB based at least in part on the feedback communication. More particularly, the network entity 610 may only need to retransmit a group of CBGs including the first-in-time CBG that was incorrectly decoded as well as any following CBGs. With respect to the example of a TB including twelve CBGs, if the feedback communication includes an indication of "00," the network entity 610 may not need to retransmit any portion of the TB, because such an indication may signal ACK for the TB as a whole. However, if the feedback communication includes an indication of "01," the network entity 610 may need to retransmit all CBGs, because the first-in-time CBG that was incorrectly decoded was included in the first one-third of the CBGs. If the feedback communication includes an indication of "10," the network entity 610 may need to only retransmit the final eight CBGs, because the first-in-time CBG that was incorrectly decoded was included in the second one-third of the CBGs. And, similarly, if the feedback communication includes an indication of "11," the network entity 610 may need to only retransmit the final four CBGs, because the first-in-time CBG that was incorrectly decoded was included in the third one-third of the CBGs.

In some other aspects, the number of feedback bits of the feedback communication may jointly encode ACK/NACK feedback for the TB and a quantity of CBGs that were incorrectly decoded. More particularly, in such aspects, the feedback bits may include two or more bits. When all of the feedback bits are "0," the feedback bits may indicate an ACK feedback for the transport block as a whole. Thus, in an example in which the feedback bits include two bits, an indication of "00" may indicate ACK for the TB as a whole.

However, when at least one of the feedback bits is "1," the feedback bits may indicate a NACK feedback for the TB and the quantity of CBGs that were incorrectly decoded. Thus, for two bits, indications of "01," "10," or "11" may indicate a NACK feedback as well as the quantity of CBGs that were incorrectly decoded. More particularly, and indication of "01" may indicate that one CBG was incorrectly decoded, an indication of "10" may indicate that two CBGs were incorrectly decoded, and an indication of "11" may indicate that three or more CBGs were incorrectly decoded. In some other aspects, more feedback bits may be utilized to provide finer granularity (e.g., for m feedback bits, feedback information may be signaled for a quantity of up to $2^m-1$ CBGs).

In such aspects, the network entity 610 may beneficially be provided with feedback about an effectiveness of the transmission parameters used to send the TB. For example, if the feedback communication indicates that no CBGs were incorrectly decoded or that only a small number of CBGs were incorrectly decoded, the network entity 610 may determine that the transmission parameters (e.g., a MCS or the like) used were effective and thus retransmit the TB and/or transmit future TBs using the same transmission parameters. However, if the feedback communication indicates that many CBGs were incorrectly decoded, the network entity 610 may determine that the transmission parameters used were not effective and thus retransmit the TB and/or transmit future TBs using different transmission parameters, such as a smaller MCS or the like.

In some other aspects, each of the feedback bits may indicate ACK/NACK feedback for a group of two or more CBGs. Put another way, the network entity 610 and/or the UE 605 may partition the TB into groups of CBGs, and the UE 605 may transmit an ACK/NACK bit for each group of CBGs. For example, feedback for every two CBGs may be indicated using one feedback bit such that, if both CBGs are correctly decoded, the UE 605 may send an ACK feedback for the two CBGs, while if at least one of the two CBGs is incorrectly decoded, the UE 605 may send a NACK feedback for the two CBGs. Moreover, in some aspects, the groups of CBGs may extend across multiple TBs (e.g., extend across multiple PDSCH communications). More particularly, in some aspects, the group of two or more CBGs may include at least one CBG of a first TB and at least one other CBG, of a number of other CBGs, associated with a second TB.

In such aspects, when one or more CBGs in incorrectly decoded, the network entity 610 may beneficially retransmit less than all of the TB based at least in part on the feedback communication. More particularly, the network entity 610 may only need to retransmit CBGs belonging to a group of CBGs associated with a NACK feedback. Moreover, combining feedback resources across multiple TBs and/or multiples PDSCHs may beneficially reduce resources dedicated to HARQ processes.

As indicated above, FIG. 6 is provided as an example. Other examples may differ from what is described with respect to FIG. 6.

Figure 7:
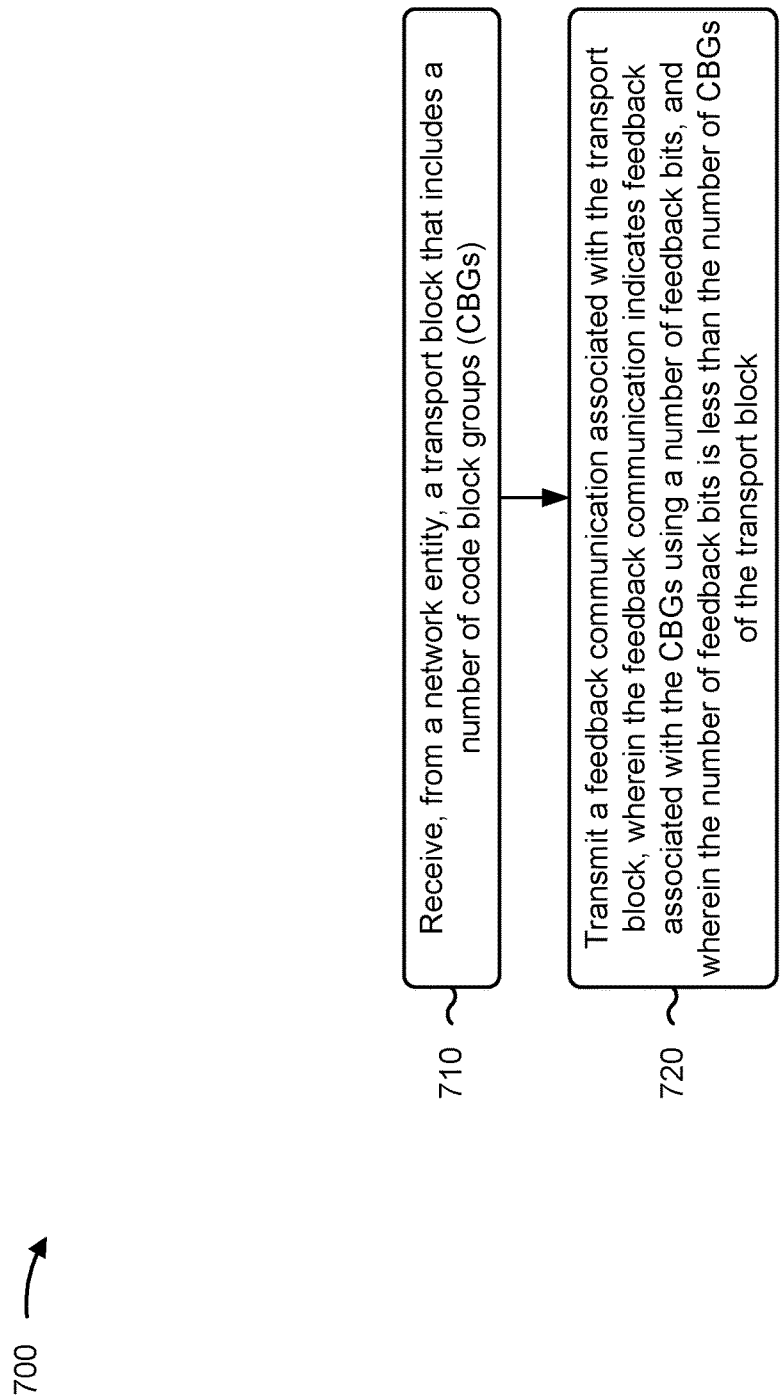
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 605) performs operations associated with feedback communications for TBs with multiple CBGs.

As shown in FIG. 7, in some aspects, process 700 may include receiving, from a network entity (e.g., network entity 610), a transport block that includes a number of CBGs (block 710). For example, the UE (e.g., using communication manager 908 and/or reception component 902, depicted in FIG. 9) may receive, from a network entity, a transport block that includes a number of CBGs, as described above.

As further shown in FIG. 7, in some aspects, process 700 may include transmitting a feedback communication associated with the transport block, wherein the feedback communication indicates feedback associated with the CBGs using a number of feedback bits, and wherein the number of feedback bits is less than the number of CBGs of the transport block (block 720). For example, the UE (e.g., using communication manager 140 and/or transmission component 904, depicted in FIG. 9) may transmit a feedback communication associated with the transport block, wherein the feedback communication indicates feedback associated with the CBGs using a number of feedback bits, and wherein the number of feedback bits is less than the number of CBGs of the transport block, as described above.

Process 700 may include additional aspects, such as any single aspect or any combination of aspects described below and/or in connection with one or more other processes described elsewhere herein.

In a first aspect, the number of feedback bits jointly encode acknowledgement/negative acknowledgement feedback for the transport block and a location of a first-in-time CBG that was incorrectly decoded.

In a second aspect, alone or in combination with the first aspect, when all of the feedback bits are 0, the feedback bits indicate an acknowledgement feedback for the transport block, and when at least one of the feedback bits is 1, the feedback bits indicate a negative acknowledgement feedback for the transport block and a location of the first-in-time CBG that was incorrectly decoded.

In a third aspect, alone or in combination with one or more of the first and second aspects, the feedback bits jointly encode acknowledgement/negative acknowledgement feedback for the transport block and a quantity of CBGs that were incorrectly decoded.

In a fourth aspect, alone or in combination with one or more of the first through third aspects, when all of the feedback bits are 0, the feedback bits indicate an acknowledgement feedback for the transport block, and when at least one of the feedback bits is 1, the feedback bits indicate a negative acknowledgement feedback for the transport block and the quantity of CBGs that were incorrectly decoded.

In a fifth aspect, alone or in combination with one or more of the first through fourth aspects, each of the feedback bits indicates acknowledgement/negative acknowledgement feedback for a group of two or more CBGs.

In a sixth aspect, alone or in combination with one or more of the first through fifth aspects, the group of two or more CBGs includes at least one CBG of the transport block and at least one other CBG, of a number of other CBGs, associated with another transport block.

In a seventh aspect, alone or in combination with one or more of the first through sixth aspects, process 700 includes receiving, from the network entity, a configuration of the feedback communication.

In an eighth aspect, alone or in combination with one or more of the first through seventh aspects, process 700 includes receiving, from the network entity, a configuration of multiple feedback communication types, wherein each of the feedback communication types is associated with a different CBG feedback granularity.

In a ninth aspect, alone or in combination with one or more of the first through eighth aspects, the configuration of the multiple feedback communication types is received via a radio resource control message.

In a tenth aspect, alone or in combination with one or more of the first through ninth aspects, process 700 includes selecting one of the multiple feedback communication types based at least in part on the number of CBGs of the transport block.

In an eleventh aspect, alone or in combination with one or more of the first through tenth aspects, the multiple feedback communication types include three feedback communication types, a first feedback communication type, of the three feedback communication types, is selected when the number of CBGs of the transport block is below a first threshold, a second feedback communication type, of the three feedback communication types, is selected when the number of CBGs of the transport block exceeds the first threshold and is below a second threshold, and a third feedback communication type, of the three feedback communication types, is selected when the number of CBGs of the transport block exceeds the second threshold.

In a twelfth aspect, alone or in combination with one or more of the first through eleventh aspects, process 700 includes receiving, from the network entity, an indication selecting one of the multiple feedback communication types.

In an thirteenth aspect, alone or in combination with one or more of the first through twelfth aspects, the indication selecting the one of the multiple feedback communication types is indicated using a downlink control information message that schedules a transmission of the transport block.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
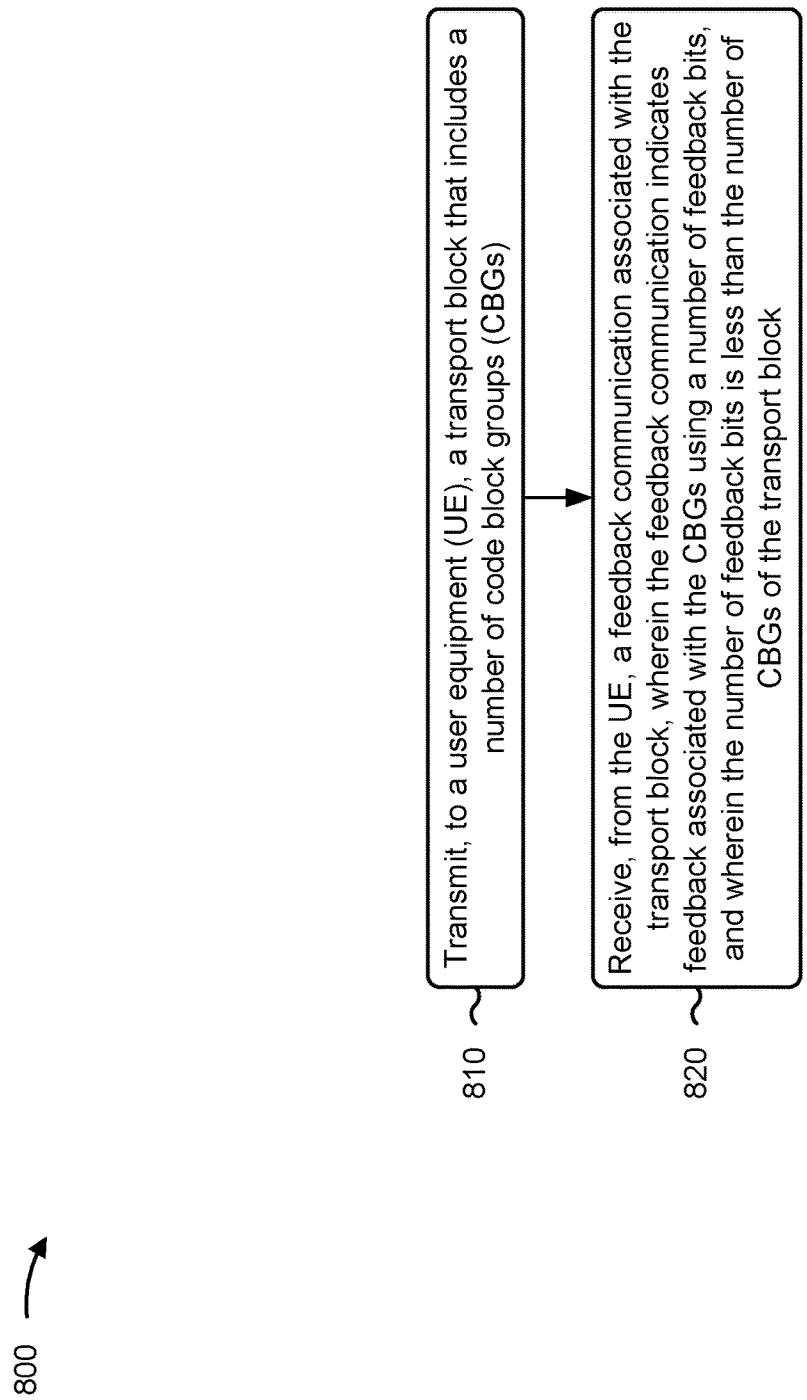
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., network entity 610) performs operations associated with feedback communications for TBs with multiple CBGs.

As shown in FIG. 8, in some aspects, process 800 may include transmitting, to a UE (e.g., UE 605), a transport block that includes a number of CBGs (block 810). For example, the network entity (e.g., using communication manager 1008 and/or transmission component 1004, depicted in FIG. 10) may transmit, to a UE, a transport block that includes a number of CBGs, as described above.

As further shown in FIG. 8, in some aspects, process 800 may include receiving, from the UE, a feedback communication associated with the transport block, wherein the feedback communication indicates feedback associated with the CBGs using a number of feedback bits, and wherein the number of feedback bits is less than the number of CBGs of the transport block (block 820). For example, the network entity (e.g., using communication manager 1008 and/or reception component 1002, depicted in FIG. 10) may receive, from the UE, a feedback communication associated with the transport block, wherein the feedback communication indicates feedback associated with the CBGs using a number of feedback bits, and wherein the number of feedback bits is less than the number of CBGs of the transport block, as described above.

Process 800 may include additional aspects, such as any single aspect or any combination of aspects described below and/or in connection with one or more other processes described elsewhere herein.

In a first aspect, the number of feedback bits jointly encode acknowledgement/negative acknowledgement feedback for the transport block and a location of a first-in-time CBG that was incorrectly decoded.

In a second aspect, alone or in combination with the first aspect, when all of the feedback bits are 0, the feedback bits indicate an acknowledgement feedback for the transport block, and when at least one of the feedback bits is 1, the feedback bits indicate a negative acknowledgement feedback for the transport block and a location of the first-in-time CBG that was incorrectly decoded.

In a third aspect, alone or in combination with one or more of the first and second aspects, the feedback bits jointly encode acknowledgement/negative acknowledgement feedback for the transport block and a quantity of CBGs that were incorrectly decoded.

In a fourth aspect, alone or in combination with one or more of the first through third aspects, when all of the feedback bits are 0, the feedback bits indicate an acknowledgement feedback for the transport block, and when at least one of the feedback bits is 1, the feedback bits indicate a negative acknowledgement feedback for the transport block and the quantity of CBGs that were incorrectly decoded.

In a fifth aspect, alone or in combination with one or more of the first through fourth aspects, each of the feedback bits indicates acknowledgement/negative acknowledgement feedback for a group of two or more CBGs.

In a sixth aspect, alone or in combination with one or more of the first through fifth aspects, the group of two or more CBGs includes at least one CBG of the transport block and at least one other CBG, of a number of other CBGs, associated with another transport block.

In a seventh aspect, alone or in combination with one or more of the first through sixth aspects, process 800 includes transmitting, to the UE, a configuration of the feedback communication.

In an eighth aspect, alone or in combination with one or more of the first through seventh aspects, process 800 includes transmitting, to the UE, a configuration of multiple feedback communication types, wherein each of the feedback communication types is associated with a different CBG feedback granularity.

In a ninth aspect, alone or in combination with one or more of the first through eighth aspect, the configuration of the multiple feedback communication types is transmitted via a radio resource control message.

In a tenth aspect, alone or in combination with one or more of the first through ninth aspects, process 800 includes selecting one of the multiple feedback communication types based at least in part on the number of CBGs of the transport block.

In an eleventh aspect, alone or in combination with one or more of the first through tenth aspects, the multiple feedback communication types include three feedback communication types, a first feedback communication type, of the three feedback communication types, is selected when the number of CBGs of the transport block is below a first threshold, a second feedback communication type, of the three feedback communication types, is selected when the number of CBGs of the transport block exceeds the first threshold and is below a second threshold, and a third feedback communication type, of the three feedback communication types, is selected when the number of CBGs of the transport block exceeds the second threshold.

In a twelfth aspect, alone or in combination with one or more of the first through eleventh aspects, process 800 includes transmitting, to the UE, an indication selecting one of the multiple feedback communication types.

In an thirteenth aspect, alone or in combination with one or more of the first through twelfth aspects, the indication selecting the one of the multiple feedback communication types is indicated using a downlink control information message that schedules a transmission of the transport block.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
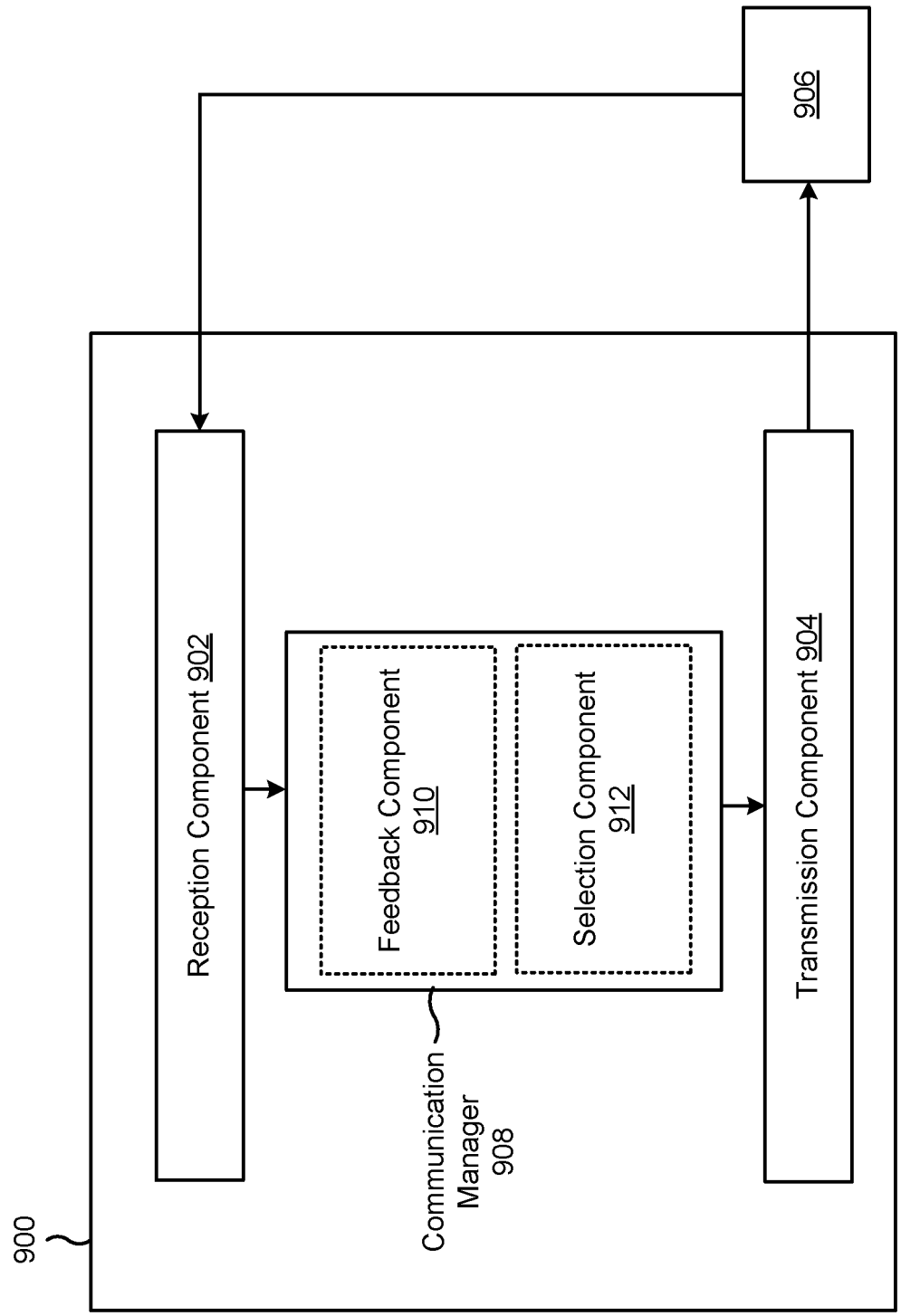
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE (e.g., UE 605), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 140). The communication manager 908 may include a feedback component 910, or a selection component 912, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE 120 described in connection with FIG. 2. In some aspects, the transmission component 904 may be co-located with the reception component 902 in a transceiver.

The reception component 902 may receive, from a network entity, a transport block that includes a number of CBGs. The transmission component 904 and/or the feedback component 910 may transmit a feedback communication associated with the transport block, wherein the feedback communication indicates feedback associated with the CBGs using a number of feedback bits, and wherein the number of feedback bits is less than the number of CBGs of the transport block.

The reception component 902 may receive, from the network entity, a configuration of the feedback communication.

The reception component 902 may receive, from the network entity, a configuration of multiple feedback communication types, wherein each of the feedback communication types is associated with a different CBG feedback granularity.

The selection component 912 may select one of the multiple feedback communication types based at least in part on the number of CBGs of the transport block.

The reception component 902 may receive, from the network entity, an indication selecting one of the multiple feedback communication types.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
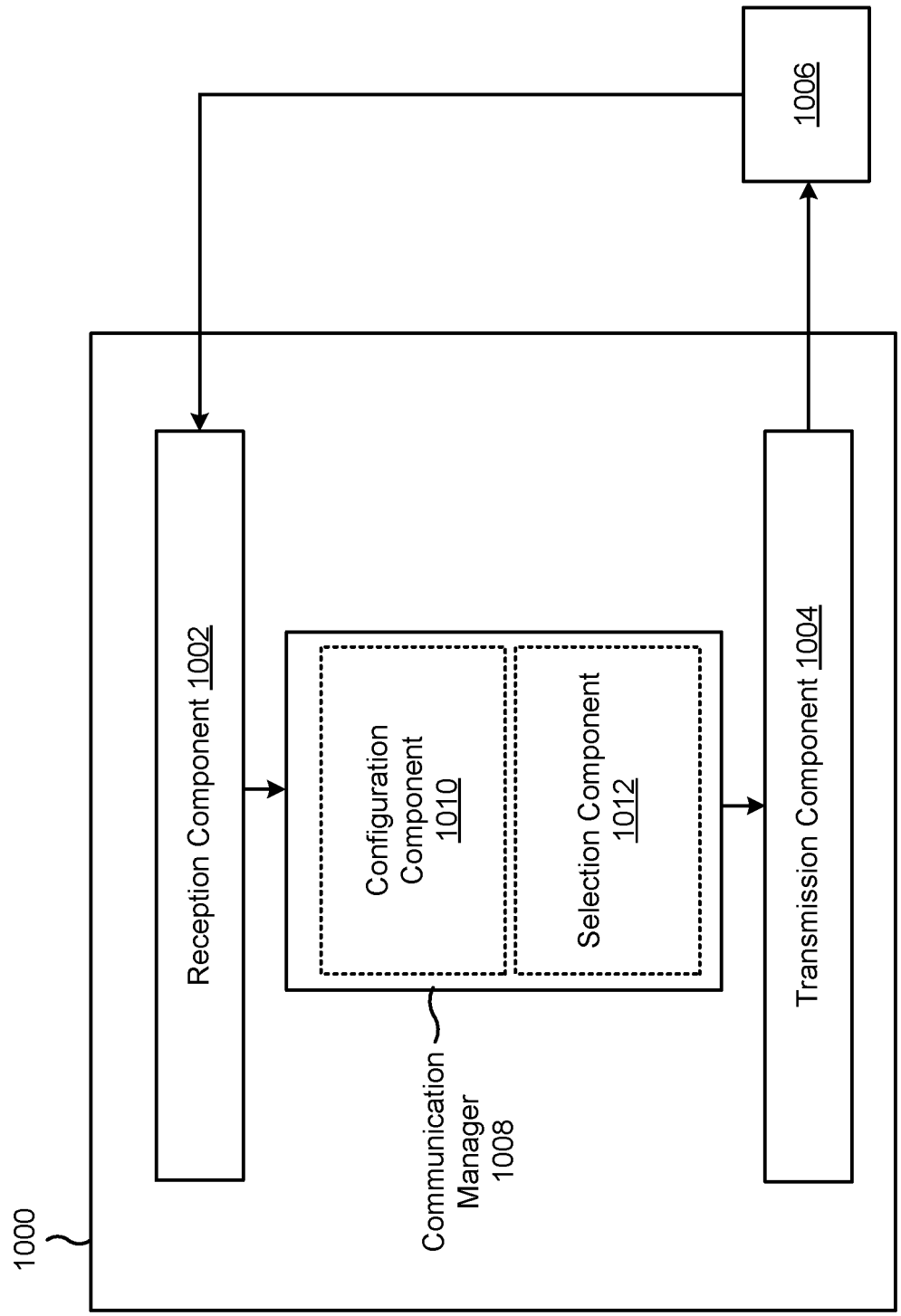
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network entity (e.g., network entity 610), or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 150). The communication manager 1008 may include one or more of a configuration component 1010, or a selection component 1012, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station 110 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station 110 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station 110 described in connection with FIG. 2. In some aspects, the transmission component 1004 may be co-located with the reception component 1002 in a transceiver.

The transmission component 1004 may transmit, to a UE, a transport block that includes a number of CBGs. The reception component 1002 may receive, from the UE, a feedback communication associated with the transport block, wherein the feedback communication indicates feedback associated with the CBGs using a number of feedback bits, and wherein the number of feedback bits is less than the number of CBGs of the transport block.

The transmission component 1004 and/or the configuration component 1010 may transmit, to the UE, a configuration of the feedback communication.

The transmission component 1004 and/or the configuration component 1010 may transmit, to the UE, a configuration of multiple feedback communication types, wherein each of the feedback communication types is associated with a different CBG feedback granularity.

The selection component 1012 may select one of the multiple feedback communication types based at least in part on the number of CBGs of the transport block.

The transmission component 1004 may transmit, to the UE, an indication selecting one of the multiple feedback communication types.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network entity, a transport block that includes a number of CBGs; and transmitting a feedback communication associated with the transport block, wherein the feedback communication indicates feedback associated with the CBGs using a number of feedback bits, and wherein the number of feedback bits is less than the number of CBGs of the transport block.

Aspect 2: The method of Aspect 1, wherein the number of feedback bits jointly encode acknowledgement/negative acknowledgement feedback for the transport block and a location of a first-in-time CBG that was incorrectly decoded.

Aspect 3: The method of Aspect 2, wherein, when all of the feedback bits are 0, the feedback bits indicate an acknowledgement feedback for the transport block, and wherein, when at least one of the feedback bits is 1, the feedback bits indicate a negative acknowledgement feedback for the transport block and a location of the first-in-time CBG that was incorrectly decoded.

Aspect 4: The method of Aspect 1, wherein the feedback bits jointly encode acknowledgement/negative acknowledgement feedback for the transport block and a quantity of CBGs that were incorrectly decoded.

Aspect 5: The method of Aspect 4, wherein, when all of the feedback bits are 0, the feedback bits indicate an acknowledgement feedback for the transport block, and wherein, when at least one of the feedback bits is 1, the feedback bits indicate a negative acknowledgement feedback for the transport block and the quantity of CBGs that were incorrectly decoded.

Aspect 6: The method of Aspect 1, wherein each of the feedback bits indicates acknowledgement/negative acknowledgement feedback for a group of two or more CBGs.

Aspect 7: The method of Aspect 6, wherein the group of two or more CBGs includes at least one CBG of the transport block and at least one other CBG, of a number of other CBGs, associated with another transport block.

Aspect 8: The method of any of Aspects 1-7, further comprising receiving, from the network entity, a configuration of the feedback communication.

Aspect 9: The method of any of Aspects 1-8, further comprising receiving, from the network entity, a configuration of multiple feedback communication types, wherein each of the feedback communication types is associated with a different CBG feedback granularity.

Aspect 10: The method of Aspect 9, wherein the configuration of the multiple feedback communication types is received via a radio resource control message.

Aspect 11: The method of any of Aspects 9-10, further comprising selecting one of the multiple feedback communication types based at least in part on the number of CBGs of the transport block.

Aspect 12: The method of Aspect 11, wherein the multiple feedback communication types include three feedback communication types, wherein a first feedback communication type, of the three feedback communication types, is selected when the number of CBGs of the transport block is below a first threshold, wherein a second feedback communication type, of the three feedback communication types, is selected when the number of CBGs of the transport block exceeds the first threshold and is below a second threshold, and wherein a third feedback communication type, of the three feedback communication types, is selected when the number of CBGs of the transport block exceeds the second threshold.

Aspect 13: The method of any of Aspects 9-12, further comprising receiving, from the network entity, an indication selecting one of the multiple feedback communication types.

Aspect 14: The method of Aspect 13, wherein the indication selecting the one of the multiple feedback communication types is indicated using a downlink control information message that schedules a transmission of the transport block.

Aspect 15: A method of wireless communication performed by a network entity, comprising: transmitting, to a UE, a transport block that includes a number of CBGs; and receiving, from the UE, a feedback communication associated with the transport block, wherein the feedback communication indicates feedback associated with the CBGs using a number of feedback bits, and wherein the number of feedback bits is less than the number of CBGs of the transport block.

Aspect 16: The method of Aspect 15, wherein the number of feedback bits jointly encode acknowledgement/negative acknowledgement feedback for the transport block and a location of a first-in-time CBG that was incorrectly decoded.

Aspect 17: The method of Aspect 16, wherein, when all of the feedback bits are 0, the feedback bits indicate an acknowledgement feedback for the transport block, and wherein, when at least one of the feedback bits is 1, the feedback bits indicate a negative acknowledgement feedback for the transport block and a location of the first-in-time CBG that was incorrectly decoded.

Aspect 18: The method of Aspect 15, wherein the feedback bits jointly encode acknowledgement/negative acknowledgement feedback for the transport block and a quantity of CBGs that were incorrectly decoded.

Aspect 19: The method of Aspect 18, wherein, when all of the feedback bits are 0, the feedback bits indicate an acknowledgement feedback for the transport block, and wherein, when at least one of the feedback bits is 1, the feedback bits indicate a negative acknowledgement feedback for the transport block and the quantity of CBGs that were incorrectly decoded.

Aspect 20: The method of Aspect 15, wherein each of the feedback bits indicates acknowledgement/negative acknowledgement feedback for a group of two or more CBGs.

Aspect 21: The method of Aspect 20, wherein the group of two or more CBGs includes at least one CBG of the transport block and at least one other CBG, of a number of other CBGs, associated with another transport block.

Aspect 22: The method of any of Aspects 15-21, further comprising transmitting, to the UE, a configuration of the feedback communication.

Aspect 23: The method of any of Aspects 15-21, further comprising transmitting, to the UE, a configuration of multiple feedback communication types, wherein each of the feedback communication types is associated with a different CBG feedback granularity.

Aspect 24: The method of Aspect 23, wherein the configuration of the multiple feedback communication types is transmitted via a radio resource control message.

Aspect 25: The method of any of Aspects 23-24, further comprising selecting one of the multiple feedback communication types based at least in part on the number of CBGs of the transport block.

Aspect 26: The method of Aspect 25, wherein the multiple feedback communication types include three feedback communication types, wherein a first feedback communication type, of the three feedback communication types, is selected when the number of CBGs of the transport block is below a first threshold, wherein a second feedback communication type, of the three feedback communication types, is selected when the number of CBGs of the transport block exceeds the first threshold and is below a second threshold, and wherein a third feedback communication type, of the three feedback communication types, is selected when the number of CBGs of the transport block exceeds the second threshold.

Aspect 27: The method of any of Aspects 23-26, further comprising transmitting, to the UE, an indication selecting one of the multiple feedback communication types.

Aspect 28: The method of Aspect 27, wherein the indication selecting the one of the multiple feedback communication types is indicated using a downlink control information message that schedules a transmission of the transport block.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, from a network entity, a transport block that includes a number of code block groups (CBGs); and
transmit a feedback communication associated with the transport block, wherein the feedback communication indicates feedback associated with the CBGs using a number of feedback bits, wherein the number of feedback bits is based at least in part on one or more threshold numbers of CBGs, wherein the number of feedback bits is less than the number of CBGs of the transport block, wherein, when all of the number of feedback bits are 0, the feedback bits indicate an acknowledgement feedback for the transport block, and wherein, when at least one of the feedback bits is 1, the feedback bits indicate a negative acknowledgement feedback for the transport block.

2. The apparatus of claim 1, wherein the number of feedback bits jointly encode acknowledgement/negative acknowledgement feedback for the transport block and a location of a first-in-time CBG that was incorrectly decoded.

3. The apparatus of claim 2, wherein, when at least one of the feedback bits is 1, the feedback bits indicate the negative acknowledgement feedback for the transport block and a location of the first-in-time CBG that was incorrectly decoded.

4. The apparatus of claim 1, wherein the number of feedback bits jointly encode acknowledgement/negative acknowledgement feedback for the transport block and a quantity of CBGs that were incorrectly decoded.

5. The apparatus of claim 4, wherein, when at least one of the number of feedback bits is 1, the number of feedback bits indicate the negative acknowledgement feedback for the transport block and the quantity of CBGs that were incorrectly decoded.

6. The apparatus of claim 1, wherein each of the number of feedback bits indicates acknowledgement/negative acknowledgement feedback for a group of two or more CBGs.

7. The apparatus of claim 6, wherein the group of two or more CBGs includes at least one CBG of the transport block and at least one other CBG, of a number of other CBGs, associated with another transport block.

8. The apparatus of claim 1, wherein the one or more processors are further configured to receive, from the network entity, a configuration of the feedback communication.

9. The apparatus of claim 1, wherein the one or more processors are further configured to receive, from the network entity, a configuration of multiple feedback communication types, wherein each of the feedback communication types is associated with a different CBG feedback granularity.

10. The apparatus of claim 9, wherein the configuration of the multiple feedback communication types is received via a radio resource control message.

11. The apparatus of claim 9, wherein the one or more processors are further configured to select one of the multiple feedback communication types based at least in part on the number of CBGs of the transport block.

12. The apparatus of claim 11, wherein the multiple feedback communication types include three feedback communication types,
wherein a first feedback communication type, of the three feedback communication types, is selected when the number of CBGs of the transport block is below a first threshold of the one or more threshold numbers of CBGs,
wherein a second feedback communication type, of the three feedback communication types, is selected when the number of CBGs of the transport block exceeds the first threshold of the one or more threshold numbers of CBGs and is below a second threshold of the one or more threshold numbers of CBGs, and wherein a third feedback communication type, of the three feedback communication types, is selected when the number of CBGs of the transport block exceeds the second threshold of the one or more threshold numbers of CBGs.

13. The apparatus of claim 9, wherein the one or more processors are further configured to receive, from the network entity, an indication selecting one of the multiple feedback communication types.

14. The apparatus of claim 13, wherein the indication selecting the one of the multiple feedback communication types is indicated using a downlink control information message that schedules a transmission of the transport block.

15. An apparatus for wireless communication at a network entity, comprising:
one or more memories; and
one or more processors, coupled to the one or more memories, configured to:
transmit, to a user equipment (UE), a transport block that includes a number of code block groups (CBGs); and
receive, from the UE, a feedback communication associated with the transport block, wherein the feedback communication indicates feedback associated with the CBGs using a number of feedback bits, wherein the number of feedback bits is based at least in part on one or more threshold numbers of CBGs, wherein the number of feedback bits is less than the number of CBGs of the transport block, wherein, when all of the number of feedback bits are 0, the feedback bits indicate an acknowledgement feedback for the transport block, and wherein, when at least one of the feedback bits is 1, the feedback bits indicate a negative acknowledgement feedback for the transport block.

16. The apparatus of claim 15, wherein the number of feedback bits jointly encode acknowledgement/negative acknowledgement feedback for the transport block and a location of a first-in-time CBG that was incorrectly decoded.

17. The apparatus of claim 16, wherein, when at least one of the feedback bits is 1, the feedback bits indicate the negative acknowledgement feedback for the transport block and a location of the first-in-time CBG that was incorrectly decoded.

18. The apparatus of claim 15, wherein the number of feedback bits jointly encode acknowledgement/negative acknowledgement feedback for the transport block and a quantity of CBGs that were incorrectly decoded.

19. The apparatus of claim 18, wherein, when at least one of the number of feedback bits is 1, the number of feedback bits indicate the negative acknowledgement feedback for the transport block and the quantity of CBGs that were incorrectly decoded.

20. The apparatus of claim 15, wherein each of the number of feedback bits indicates acknowledgement/negative acknowledgement feedback for a group of two or more CBGs.

21. The apparatus of claim 20, wherein the group of two or more CBGs includes at least one CBG of the transport block and at least one other CBG, of a number of other CBGs, associated with another transport block.

22. The apparatus of claim 15, wherein the one or more processors are further configured to transmit, to the UE, a configuration of multiple feedback communication types, wherein each of the feedback communication types is associated with a different CBG feedback granularity.

23. The apparatus of claim 22, wherein the one or more processors are further configured to select one of the multiple feedback communication types based at least in part on the number of CBGs of the transport block.

24. The apparatus of claim 23, wherein the multiple feedback communication types include three feedback communication types,
wherein a first feedback communication type, of the three feedback communication types, is selected when the number of CBGs of the transport block is below a first threshold of the one or more threshold numbers of CBGs,
wherein a second feedback communication type, of the three feedback communication types, is selected when the number of CBGs of the transport block exceeds the first threshold and is below a second threshold of the one or more threshold numbers of CBGs, and
wherein a third feedback communication type, of the three feedback communication types, is selected when the number of CBGs of the transport block exceeds the second threshold of the one or more threshold numbers of CBGs.

25. The apparatus of claim 22, wherein the one or more processors are further configured to transmit, to the UE, an indication selecting one of the multiple feedback communication types.

26. A method of wireless communication performed by a user equipment (UE), comprising:
receiving, from a network entity, a transport block that includes a number of code block groups (CBGs); and
transmitting a feedback communication associated with the transport block, wherein the feedback communication indicates feedback associated with the CBGs using a number of feedback bits, wherein the number of feedback bits is based at least in part on one or more threshold numbers of CBGs, wherein the number of feedback bits is less than the number of CBGs of the transport block, wherein, when all of the number of feedback bits are 0, the feedback bits indicate an acknowledgement feedback for the transport block, and wherein, when at least one of the feedback bits is 1, the feedback bits indicate a negative acknowledgement feedback for the transport block.

27. The method of claim 26, wherein the number of feedback bits jointly encode acknowledgement/negative acknowledgement feedback for the transport block and a location of a first-in-time CBG that was incorrectly decoded.

28. The method of claim 26, wherein the number of feedback bits jointly encode acknowledgement/negative acknowledgement feedback for the transport block and a quantity of CBGs that were incorrectly decoded.

29. A method of wireless communication performed by a network entity, comprising:
transmitting, to a user equipment (UE), a transport block that includes a number of code block groups (CBGs); and
receiving, from the UE, a feedback communication associated with the transport block, wherein the feedback communication indicates feedback associated with the CBGs using a number of feedback bits, wherein the number of feedback bits is based at least in part on one or more threshold numbers of CBGs, wherein the number of feedback bits is less than the number of CBGs of the transport block, wherein, when all of the number of feedback bits are 0, the feedback bits indicate an acknowledgement feedback for the transport block, and wherein, when at least one of the feedback bits is 1, the feedback bits indicate a negative acknowledgement feedback for the transport block.

30. The method of claim 29, wherein the number of feedback bits jointly encode acknowledgement/negative acknowledgement feedback for the transport block and a location of a first-in-time CBG that was incorrectly decoded.

* * * * *